United States Patent
Ryu et al.

(10) Patent No.: US 12,477,484 B2
(45) Date of Patent: Nov. 18, 2025

(54) ENABLING AND DISABLING OF AUTOMATIC GAIN CONTROL (AGC) SYMBOLS IN SIDELINK

(71) Applicant: QUALCOMM Incorporated, San Diego, CA (US)

(72) Inventors: Jung Ho Ryu, Fort Lee, NJ (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 511 days.

(21) Appl. No.: 18/160,034

(22) Filed: Jan. 26, 2023

(65) Prior Publication Data

US 2024/0259963 A1 Aug. 1, 2024

(51) Int. Cl.
*H04W 52/54* (2009.01)
*H04W 52/52* (2009.01)
*H04W 72/0446* (2023.01)
*H04W 72/20* (2023.01)

(52) U.S. Cl.
CPC ........... *H04W 52/54* (2013.01); *H04W 52/52* (2013.01); *H04W 72/0446* (2013.01); *H04W 72/20* (2023.01)

(58) Field of Classification Search
CPC . H04W 52/54; H04W 52/52; H04W 72/0446; H04W 72/20; H04L 1/0026; H04L 1/0029
See application file for complete search history.

(56) References Cited

U.S. PATENT DOCUMENTS

| | | | | |
|---|---|---|---|---|
| 11,109,363 | B2 * | 8/2021 | Huang | H04L 1/1896 |
| 11,317,381 | B2 * | 4/2022 | Li | H04L 5/0053 |
| 11,452,115 | B2 * | 9/2022 | Khoryaev | H04W 72/25 |
| 11,540,178 | B2 * | 12/2022 | Berger | H04W 4/70 |
| 11,540,303 | B1 * | 12/2022 | Wang | H04W 72/535 |
| 11,659,521 | B2 * | 5/2023 | Wang | H04W 72/02 370/329 |
| 11,736,984 | B2 * | 8/2023 | Nguyen | H04W 28/26 370/329 |
| 11,758,524 | B2 * | 9/2023 | Liu | H04L 5/0037 370/330 |
| 11,871,399 | B2 * | 1/2024 | Khoryaev | H04W 92/18 |
| 11,902,940 | B2 * | 2/2024 | Li | H04W 4/40 |
| 12,262,357 | B2 * | 3/2025 | Lee | H04W 4/40 |
| 2020/0275458 | A1 * | 8/2020 | Khoryaev | H04W 72/25 |
| 2021/0176668 | A1 * | 6/2021 | Berger | H04L 5/0078 |
| 2022/0140967 | A1 * | 5/2022 | Khoryaev | H04W 56/002 375/220 |

(Continued)

FOREIGN PATENT DOCUMENTS

WO WO-2021020954 A1 * 2/2021 ............ H04W 72/23

*Primary Examiner* — Hai V Nguyen
(74) *Attorney, Agent, or Firm* — Patterson + Sheridan LLP

(57) ABSTRACT

Certain aspects of the present disclosure provide techniques for enabling and disabling of automatic gain control (AGC) symbols in sidelink. An example method, performed at a first user equipment (UE), includes determining configuration information indicating that mini-slot transmissions, within a full-slot, are allowed, and transmitting, to a second UE, a full-slot sidelink transmission that includes a first symbol configured for automatic gain control (AGC), wherein the full slot transmission also includes one or more additional symbols configured for AGC if at least one condition is satisfied.

30 Claims, 14 Drawing Sheets

(56) References Cited

U.S. PATENT DOCUMENTS

| | | | |
|---|---|---|---|
| 2022/0167310 A1* | 5/2022 | Wang | H04L 1/1896 |
| 2022/0394733 A1* | 12/2022 | Wang | H04W 72/0453 |
| 2022/0400484 A1* | 12/2022 | Lee | H04W 72/20 |
| 2022/0416976 A1* | 12/2022 | Baek | H04W 72/51 |
| 2022/0417946 A1* | 12/2022 | Khoryaev | H04W 4/46 |
| 2023/0022077 A1* | 1/2023 | Liu | H04W 52/52 |
| 2023/0067706 A1* | 3/2023 | Liu | H04W 72/0446 |
| 2023/0148141 A1* | 5/2023 | Hu | H04L 5/0053 370/329 |
| 2023/0319857 A1* | 10/2023 | Zhou | H04W 72/40 |
| 2023/0354220 A1* | 11/2023 | Rastegardoost | H04L 5/001 |
| 2023/0389100 A1* | 11/2023 | Guo | H04B 17/336 |
| 2023/0397207 A1* | 12/2023 | Sarkis | H04W 72/20 |
| 2024/0015711 A1* | 1/2024 | Su | H04W 72/23 |
| 2024/0137975 A1* | 4/2024 | Ryu | H04W 74/0808 |
| 2024/0205945 A1* | 6/2024 | Fouad | H04W 72/40 |
| 2024/0236974 A9* | 7/2024 | Khoryaev | H04W 72/02 |
| 2024/0237061 A9* | 7/2024 | Ryu | H04W 74/0808 |
| 2025/0142595 A1* | 5/2025 | Deng | H04W 72/0446 |
| 2025/0185047 A1* | 6/2025 | Shimizu | H04W 72/40 |

\* cited by examiner

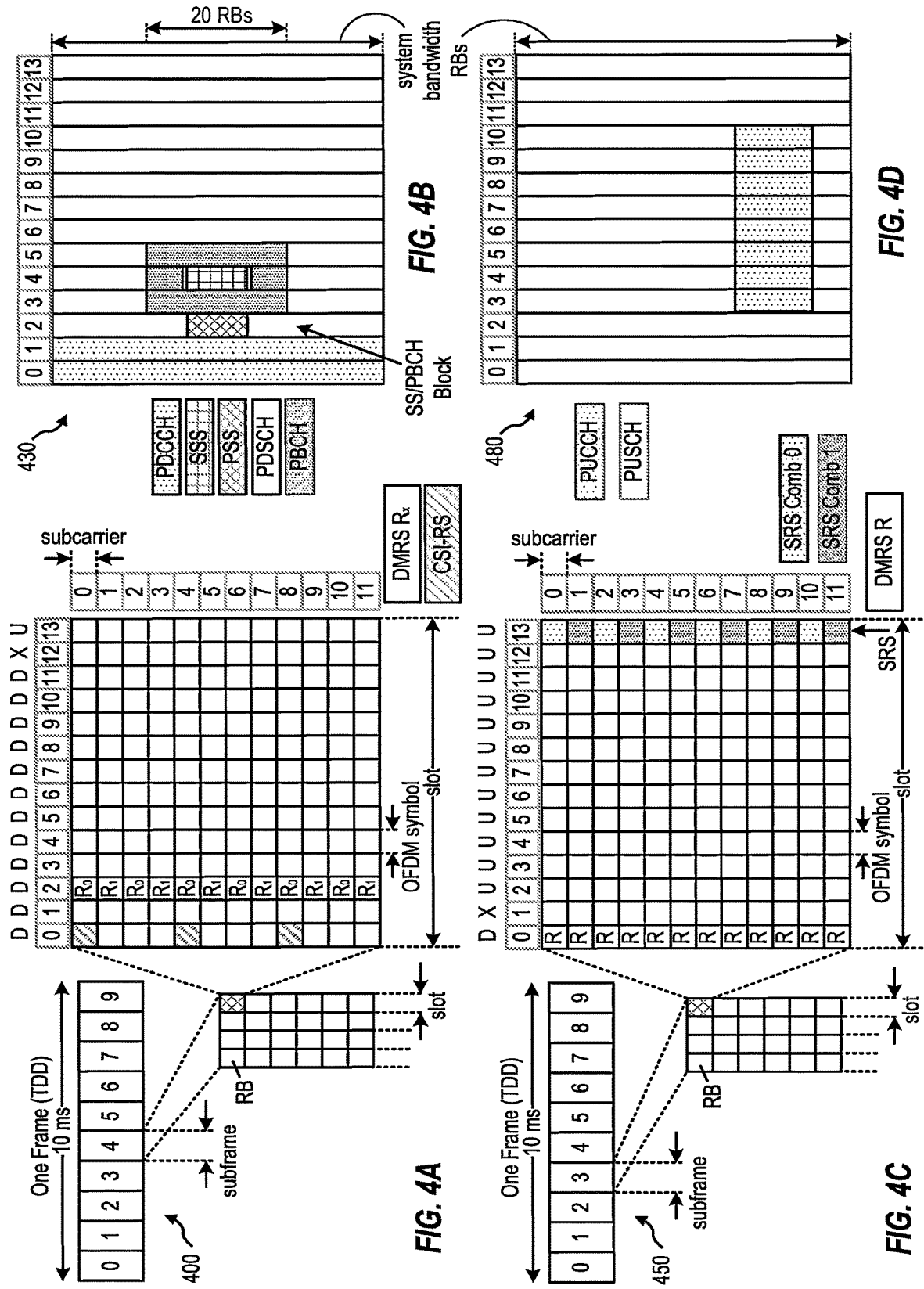

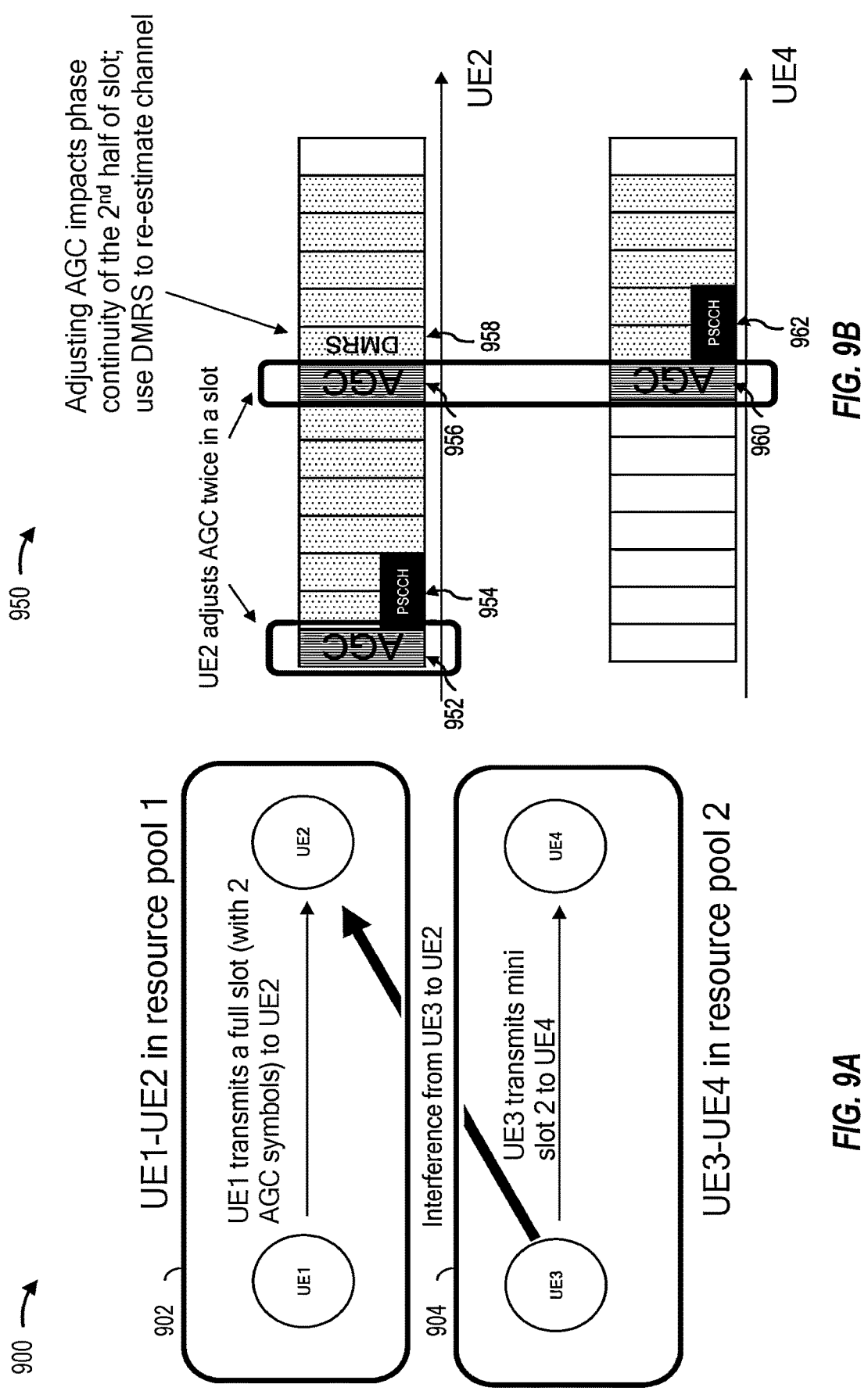

ENABLING AND DISABLING OF AUTOMATIC GAIN CONTROL (AGC) SYMBOLS IN SIDELINK

BACKGROUND

Field of the Disclosure

Aspects of the present disclosure relate to wireless communications, and more particularly, to techniques for enabling and disabling of automatic gain control (AGC) symbols for sidelink transmissions.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication at a first user equipment (UE). The method includes determining configuration information indicating that mini-slot transmissions, within a full-slot, are allowed; and transmitting, to a second UE, a full-slot sidelink transmission that includes a first symbol configured for automatic gain control (AGC), wherein the full slot transmission also includes one or more additional symbols configured for AGC if at least one condition is satisfied.

Another aspect provides a method for wireless communication at a second UE. The method includes determining configuration information indicating that mini-slot transmissions, within a full-slot, are allowed; and processing a full-slot sidelink transmission, from a first UE, that includes a first symbol configured for AGC, wherein the full slot transmission also includes one or more additional symbols configured for AGC if at least one condition is satisfied.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

FIGS. 9A and 9B depict an example scenario illustrating sidelink transmissions with an additional AGC symbol, in accordance with certain aspects of the present disclosure.

DETAILED DESCRIPTION

Figure 1:
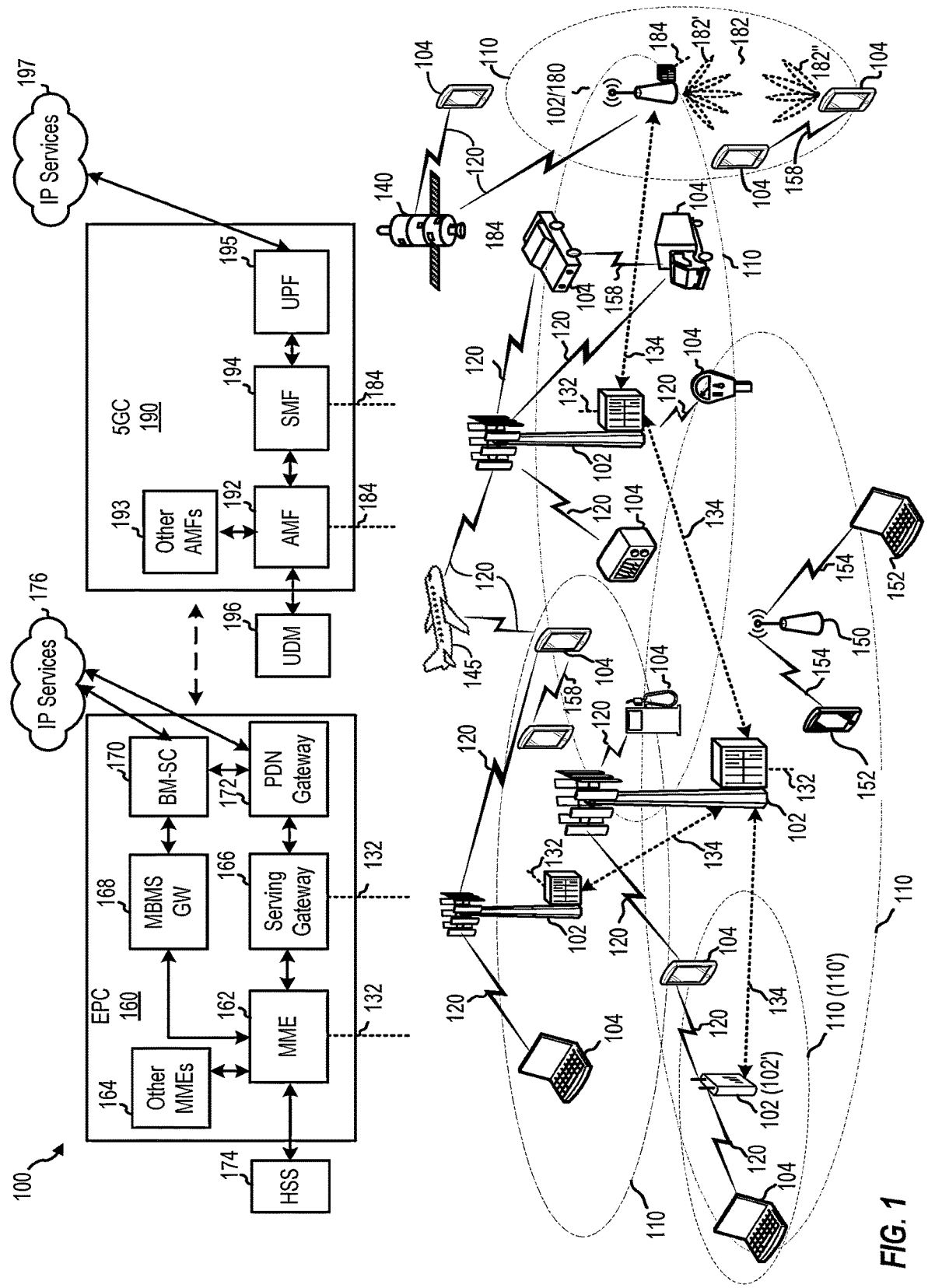
FIG. 1 depicts an example wireless communications network.

Aspects of the present disclosure provide apparatuses, methods, processing systems, and computer-readable mediums for enabling and disabling of automatic gain control (AGC) symbols in sidelink transmissions.

Sidelink (SL) communication generally refers to direct communications between devices, including user equipments (UEs), such as mobile phones. Sidelink communications beneficially allow for communication between such devices without involving network resources (e.g., base stations), though a network may be involved with configuring the sidelink resources.

Sidelink communications structures may mimic those used in non-sidelink communications with a network, such as slot-based allocation of time and frequency resources to determine when a device can transmit and/or receive data. A slot generally refers to a fixed number of symbols, such as 14 orthogonal frequency-division multiplexing (OFDM) symbols. However, it may be desirable to enable additional communication structures for sidelink communications, such as mini-slots (e.g., intra-slot structures). Utilization of mini-slot structures for sidelink communications may increase resource utilization by allowing for smaller and more frequent allocations of resources beyond the traditional minimum resource allocation unit of a slot.

Automatic gain control (AGC) generally refers to a mechanism used to automatically adjust the gain of an amplifier to maintain a constant output level (e.g., even in the presence of varying input levels). An AGC mechanism monitors an output level and adjust amplifier gain accordingly to keep the level within a specified range. This helps to prevent overloading of the system and ensures that the output is always within a usable range. AGC may also prevent distortion and clipping of the output signal, which may occur when the input level is too high and may also help to improve the Signal to Interference and Noise Ratio (SINR), making it easier to detect and process weak signals.

In some cases, a receive (Rx) sidelink (SL) UE may use dedicated symbols (e.g., in the $1^{st}$ SL symbol), referred to as AGC symbols in a sidelink transmission from a transmit (Tx) SL UE, to estimate the total power it will receive in the entire SL slot and set the AGC accordingly (e.g., assuming that all SL UEs will start and end their transmissions at the SL slot boundaries). In some scenarios, however, sidelink transmissions by one Tx SL UE using mini-slot structures may create challenges for AGC by a Rx SL UE paired with another Tx SL UE. For example, if an Rx SL UE has performed AGC based on an AGC symbol (e.g., in the $1^{st}$ SL symbol) of a full slot SL transmission from one Tx SL UE and a nearby Tx SL UE starts its mini-slot transmission in the middle of the full slot, the AGC setting of the Rx SL UE may not be appropriate, as the Rx SL UE may receive additional power (unaccounted for in the AGC setting).

To account for the scenario described above, an additional AGC symbol may be included in a full slot transmission. This additional AGC symbol may allow the Rx SL UE to adjust its AGC twice within the full slot, to account for the impact of the additional power received due to the other Tx UE mini-slot transmission. Unfortunately, if there are no nearby SL Tx UEs performing mini-slot transmissions, transmitting additional AGC symbols by a full-slot Tx UE is unnecessary and results in a waste of resources (e.g., a symbol that could have been used to transmit additional data).

Aspects of the present disclosure, however, provide techniques for enabling and disabling transmission of additional AGC symbols in a full slot sidelink transmission. For example, additional AGC symbols may be transmitted by a full-slot Tx SL UE only when one or more conditions are satisfied. For example, additional AGC symbols may be enabled only when mini-slot transmissions by a nearby UE are detected. As a result, resources may be used for AGC symbols when beneficial or, otherwise, used for data. Therefore, aspects of the present disclosure may help avoid the waste of resources mentioned above when there are no nearby mini-slot transmissions, while still allowing the transmission of additional AGC symbols for AGC adjustment when there are nearby mini-slot transmissions.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
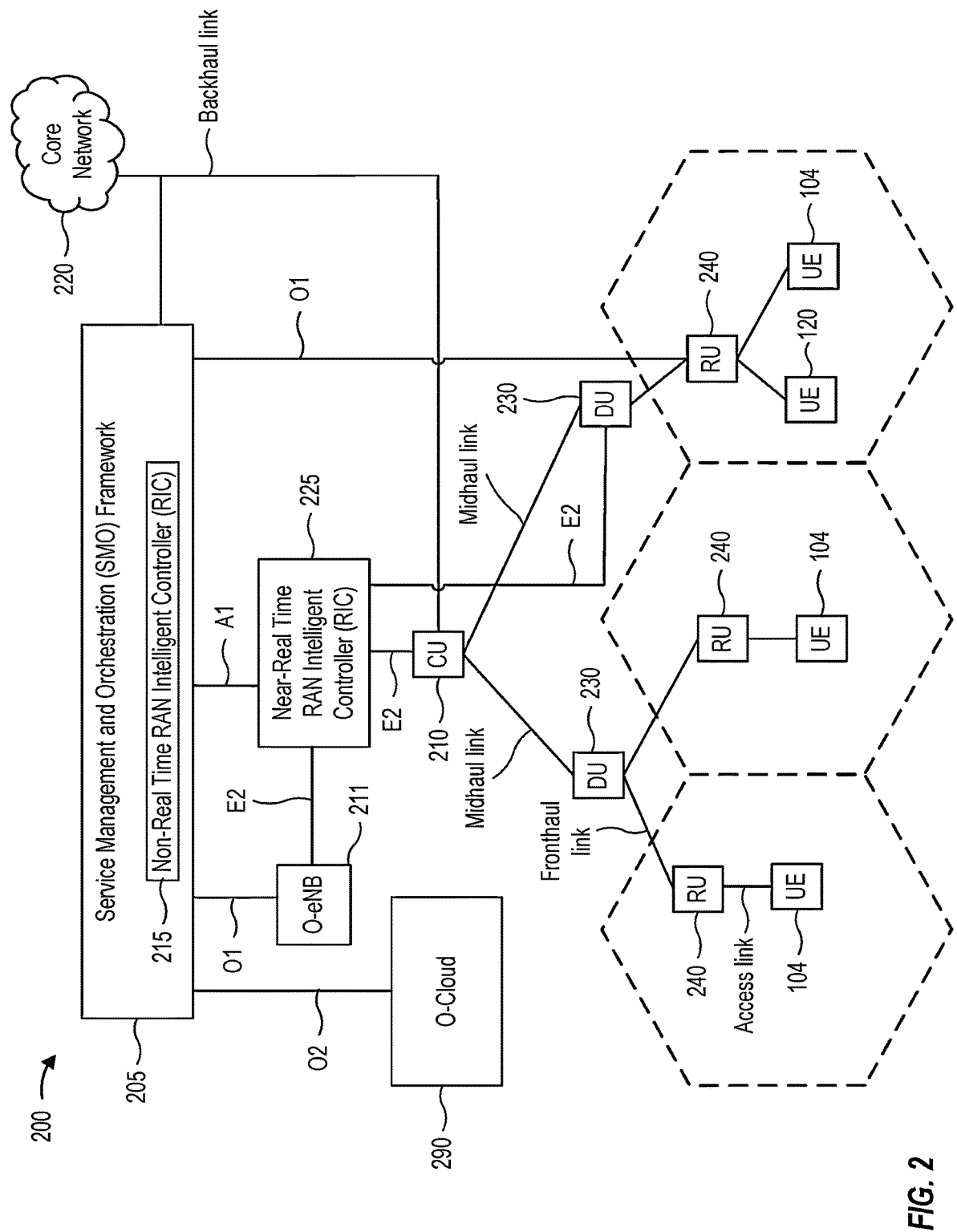
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
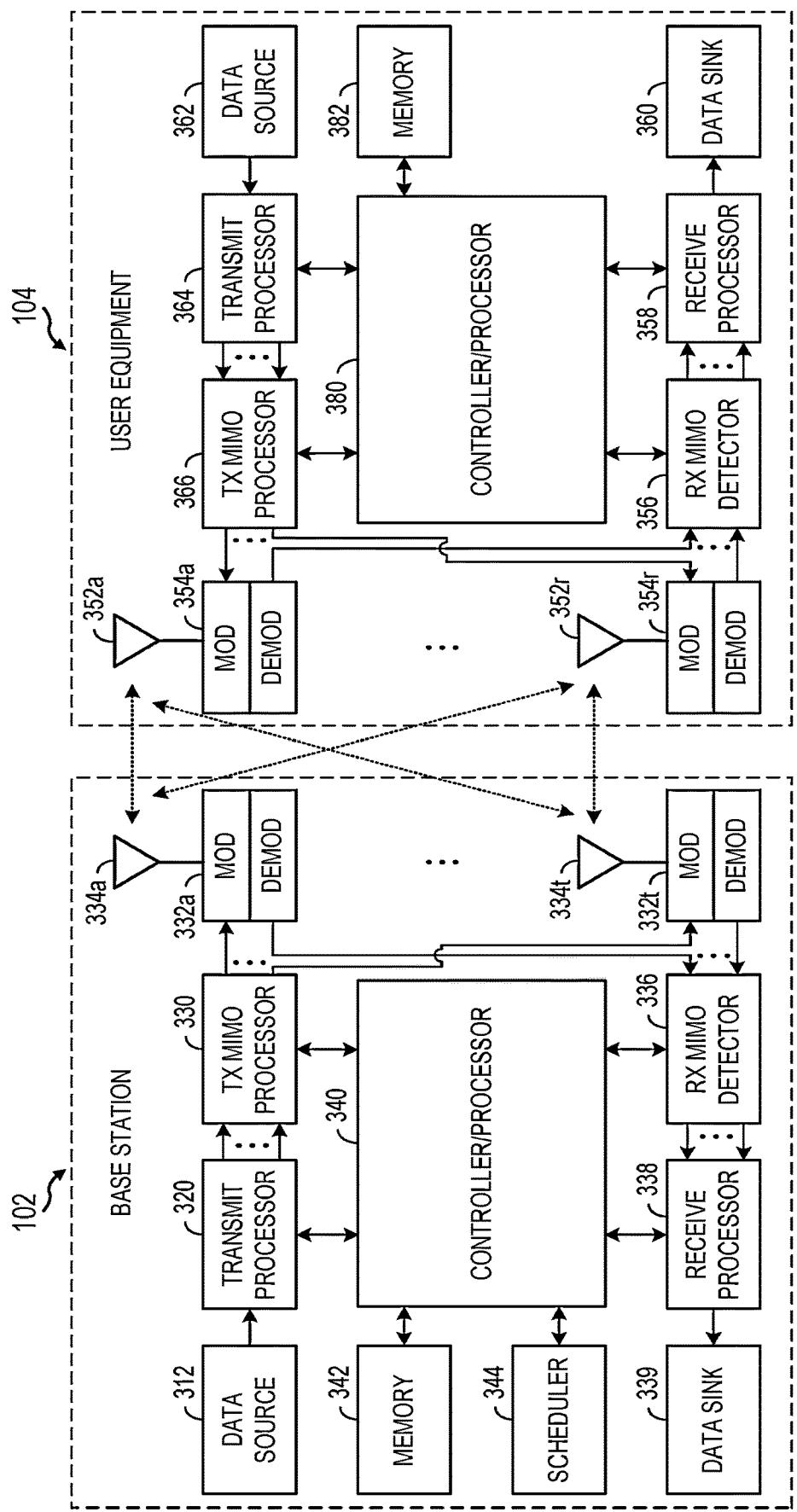
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of Mode 1 and Mode 2 Operation in Sidelink Communications

Sidelink communications may be performed in various modes. For example, in Mode 1 operation, a base station indicates to a sidelink user equipment which resources to use to make a sidelink transmission. In Mode 2 operation, a sidelink user equipment identifies resources for the sidelink transmissions on its own, for example, based on channel sensing.

In Mode 1 operation, the resources that the sidelink user equipment can use to transmit may be configured in a downlink control message, such as a DCI 3_0 message. The downlink control message includes a time resource assignment, which indicates which slot the sidelink transmit user equipment can use to transmit. The time resource assignment may indicate up to three sidelink slots, the first of which is an initial transmission, and the second and third of which are retransmissions. The downlink control message also includes a frequency resource assignment, which indicates where in the frequency spectrum the sidelink user equipment can make the transmission.

In addition to a downlink control message, sidelink control information (SCI) may also contain a time resource assignment. The SCI time resource assignment may be used by a sidelink user equipment to indicate to another sidelink user equipment (e.g., a receiving sidelink user equipment) which slot it will use to make the sidelink transmission.

In Mode 2 operation, as noted above, the transmitting sidelink user equipment determines which resources it will use for the sidelink transmission. Once the transmitting sidelink user equipment determines which resources to use, it will include that information in the time resource assignment of the SCI to tell the receiving sidelink user equipment in which slots to expect to receive transmissions.

In addition to the time resource assignment, the SCI also contains a resource reservation period. The resource reservation period can be used to reserve multiple slots at configurable periodicities. The reserved slots are for new, future transmissions.

It is beneficial to differentiate between different sidelink modes of operation when configuring mini-slots for use, and especially considering future resource reservations while using mini-slots. Accordingly, aspects of the present disclosure enable configuration and use of mini-slots in Mode 1 and Mode 2 sidelink operations.

Overview of Sidelink Slot Structures

As noted above, sidelink communications generally refer to direct communications between devices, such as user equipment to user equipment communications. Generally, sidelink communications may use communication structures, like slots, for these direct communications, which may comprise a configurable number of data symbols. For example, a typical slot may comprises 12 or 14 OFDM symbols, which may include, for example, downlink symbols, uplink symbols, flexible symbols, and other types. Generally, a slot is marked for sidelink communications if it contains OFDM symbols that are configured for sidelink communications.

Sidelink slots are defined by at least two parameters. First, a symbol start parameter is the symbol index of the first sidelink symbol of the sidelink slot. In other words, the symbol start parameter indicates where in the slot the sidelink portion starts. For example, a symbol start parameter may be a parameter such as sl-StartSymbol. Next, a symbol length parameter indicates the length of the sidelink slot in symbols. For example, a symbol length parameter may be sl-LengthSymbols. In some cases, these parameters may be configured per sidelink bandwidth part (BWP).

Sidelink slots may have specific structure (or format) characteristics, such as always beginning with a symbol configured for automatic gain control (AGC). In such formats, symbols for physical sidelink shared channel (PSSCH) communications may begin in the second symbol of the slot and can be, for example, five to twelve symbols long. Further, a physical sidelink control channel (PSCCH) may be frequency duplexed with PSSCH in symbols, generally starting from second sidelink symbol in the slot, and is generally two or three symbols long. Remaining symbols in a sidelink slot are generally either gap symbols, physical sidelink feedback channel (PSFCH) symbols, downlink symbols, and/or uplink symbols, though other symbols are possible. These are just some examples, and other configurations are possible.

Example Slot Format for Mini-Slots with AGC Symbols for Sidelink

Figure 5A:
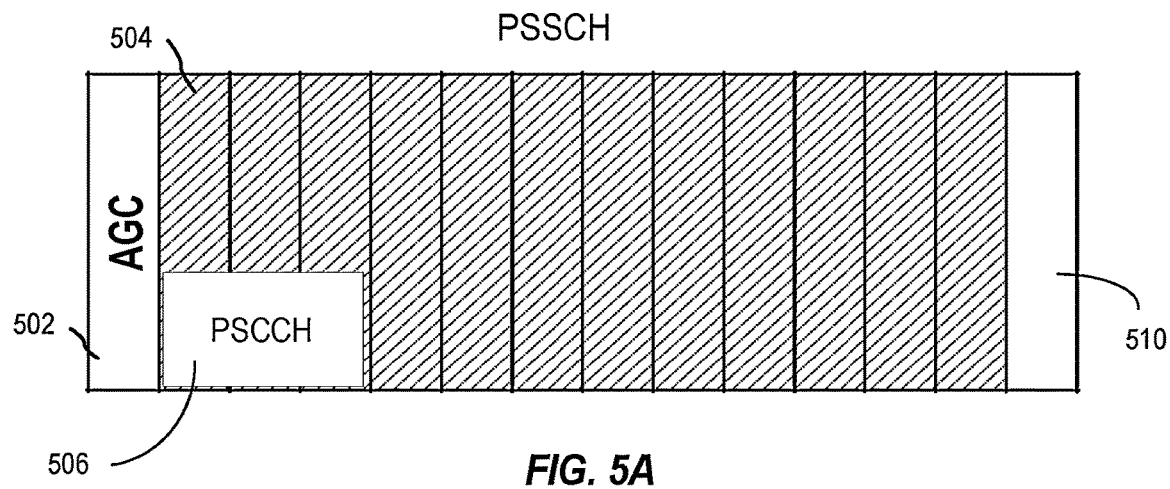
FIG. 5A depicts an example sidelink slot structure having an automatic gain control (AGC) symbol.

FIG. 5A depicts an example sidelink slot structure 500 having an automatic gain control (AGC) symbol. The example sidelink slot structure 500 comprises 14 OFDM symbols. The first symbol 502 in slot structure 500 is a symbol designated for use for AGC by a receiver, and thus may be referred to as an "AGC symbol." The next 12 symbols are PSSCH symbols 504 corresponding to a sidelink data portion of the sidelink slot structure 500. Generally, the PSSCH can be 5 to 12 symbols long, based on the sidelink symbol length parameter. Sidelink structure 500 includes 3 PSCCH symbols 506, corresponding to a control portion of the sidelink slot structure 500, frequency duplexed with the PSSCH symbols starting at the second slot symbol. Generally, the PSCCH symbols 506 are 2 or 3 symbols in length and are frequency duplexed with the PSSCH symbols. The PSSCH symbols 504 are followed by a gap symbol 510. The gap symbol allows the user equipment to switch beams or switch from receiving to transmitting.

Figure 5B:
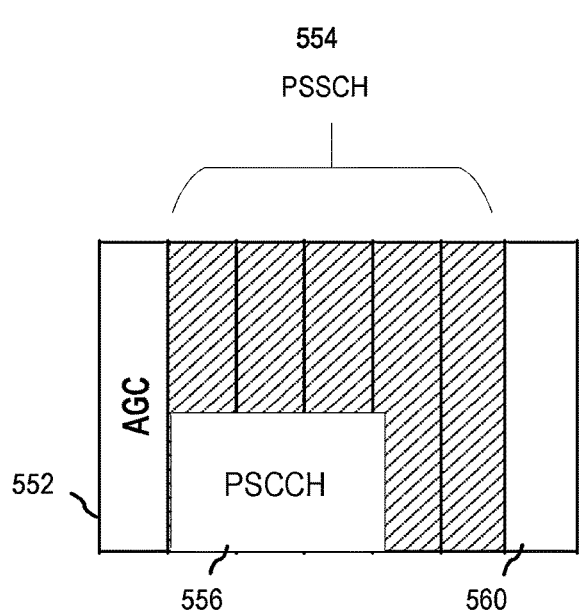
FIG. 5B depicts an example sidelink mini-slot structure having an automatic gain control (AGC) symbol.

FIG. 5B depicts an example sidelink mini-slot structure 550 having an automatic gain control (AGC) symbol. The mini-slot structure 550 includes an AGC symbol 552, which may allow an Rx UE to accurately set amplifier gain. The mini-slot structure 550 is 7 OFDM symbols in length. The mini-slot structure 550 comprises five PSSCH symbols 554 and three PSCCH symbols 556. The PSSCH symbols 554 are followed by a gap symbol 560.

Figure 6:
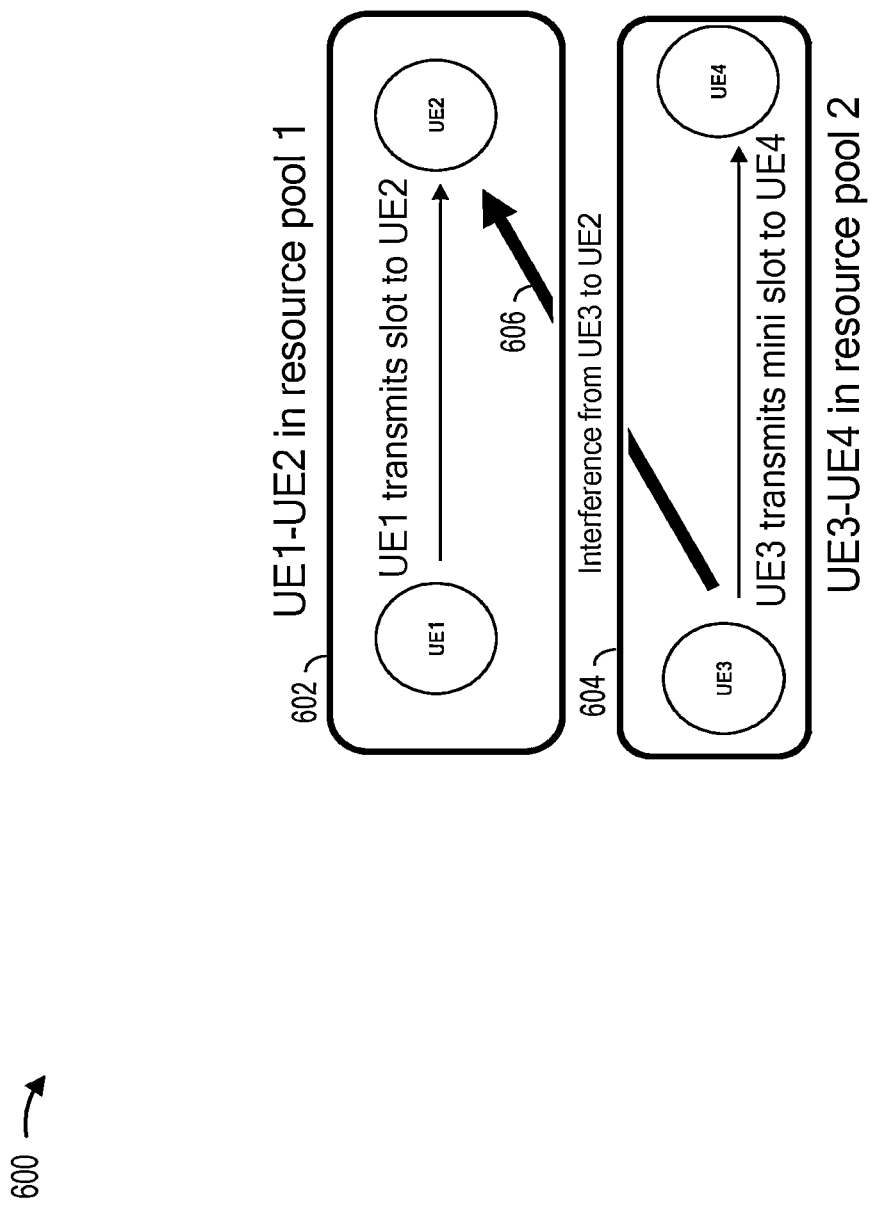
FIG. 6 depicts an example scenario illustrating interference caused by sidelink transmissions.

FIG. 6 depicts an example scenario 600 illustrating interference caused by sidelink transmissions. In the illustrated example scenario 600, UE1 and UE2 are in resource pool 1, whereas UE3 and UE4 are in resource pool 2. As illustrated at 602, UE1 may transmit a slot (e.g., a full slot) to UE2. In some cases, the slot may include a single AGC symbol in the first sidelink symbol. As illustrated at 604, UE3 may transmit a mini-slot to UE4. In some cases, as shown at 606, UE3's sidelink mini-slot transmission may cause interference (e.g., to UE2 while processing the transmission from UE1).

Figure 7:
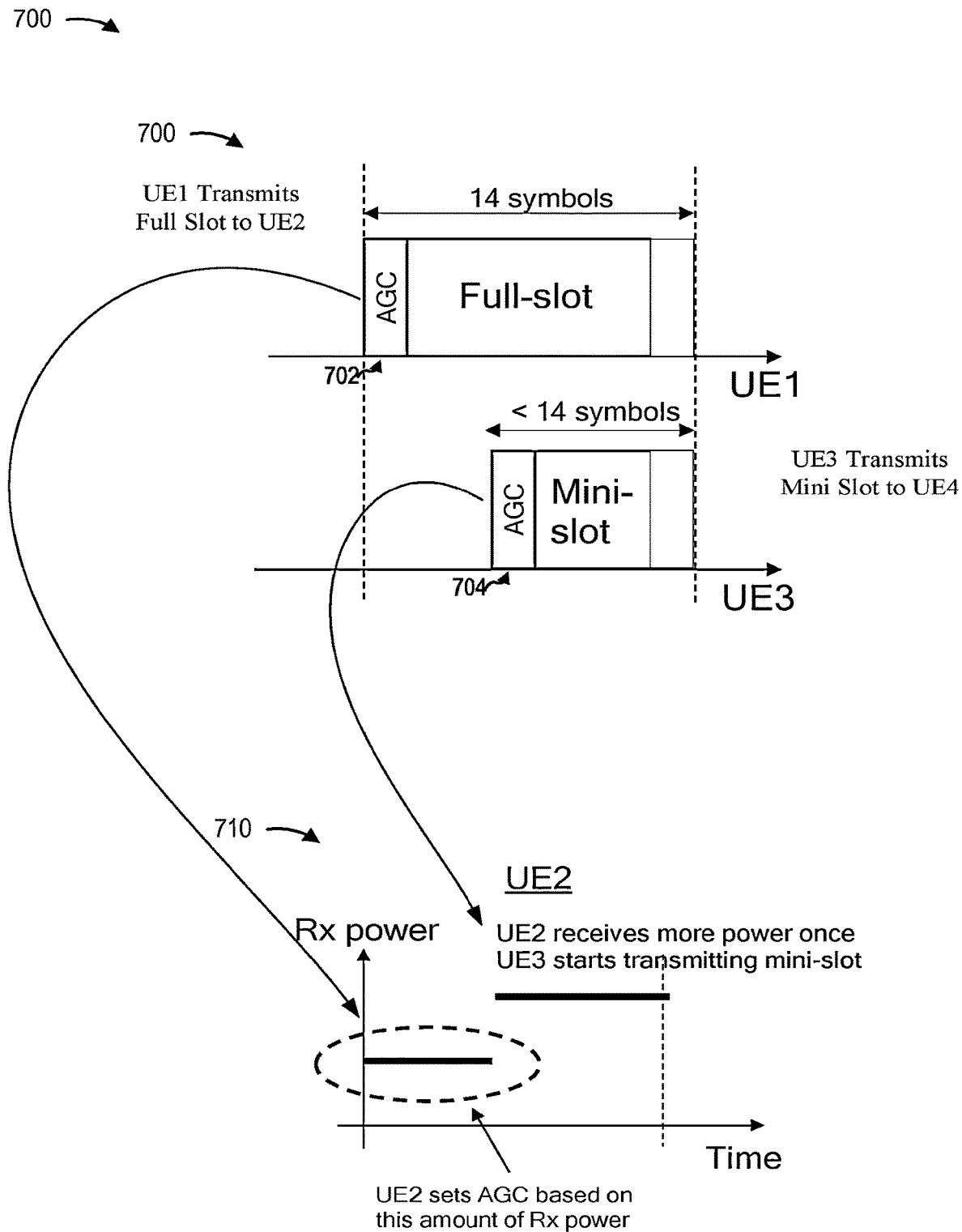
FIG. 7 depicts a timing diagram and a graph illustrating receive power over time, for the example scenario illustrated in FIG. 6.

FIG. 7 depicts a timing diagram 700 and a graph 710 illustrating receive power over time, for the example scenario illustrated in FIG. 6. As illustrated in FIG. 7, and described above with reference to FIG. 6, UE1 may transmit a slot (e.g., a full slot) to UE2. The full slot transmission includes 14 symbols, and may include an AGC symbol 702 in the first SL symbol to allow for estimation (e.g., by UE2) of the total power it will receive in the entire SL slot and set the AGC accordingly (e.g., assuming that all SL UEs will start and end their transmissions at the SL slot boundaries).

If, however, a nearby UE (e.g., UE3 in the illustrated scenario) starts its transmission (e.g., of a mini-slot) in the middle of UE1's full slot transmission, AGC setting of receive UE (e.g., UE2, receiving the full slot transmission) may not be appropriate. As illustrated, UE3 transmits a mini-slot, including an AGC symbol 704, to UE4 in the middle of UE1's full slot transmission. As described above, this may cause interference to UE2.

This interference may be understood with reference to the graph 710 illustrated in FIG. 7. As illustrated, the receiver (UE2) sets AGC based on an amount of receive power at the time of the AGC symbol in UE1's full slot transmission. However, when UE3's mini-slot transmission begins, UE2 receives additional power, which is unaccounted for by the initial AGC setting. This problem may exist even if UE3 transmits the mini-slot in a resource pool different from UE1's, as described with reference to FIG. 6.

Figures 8A, 8B:
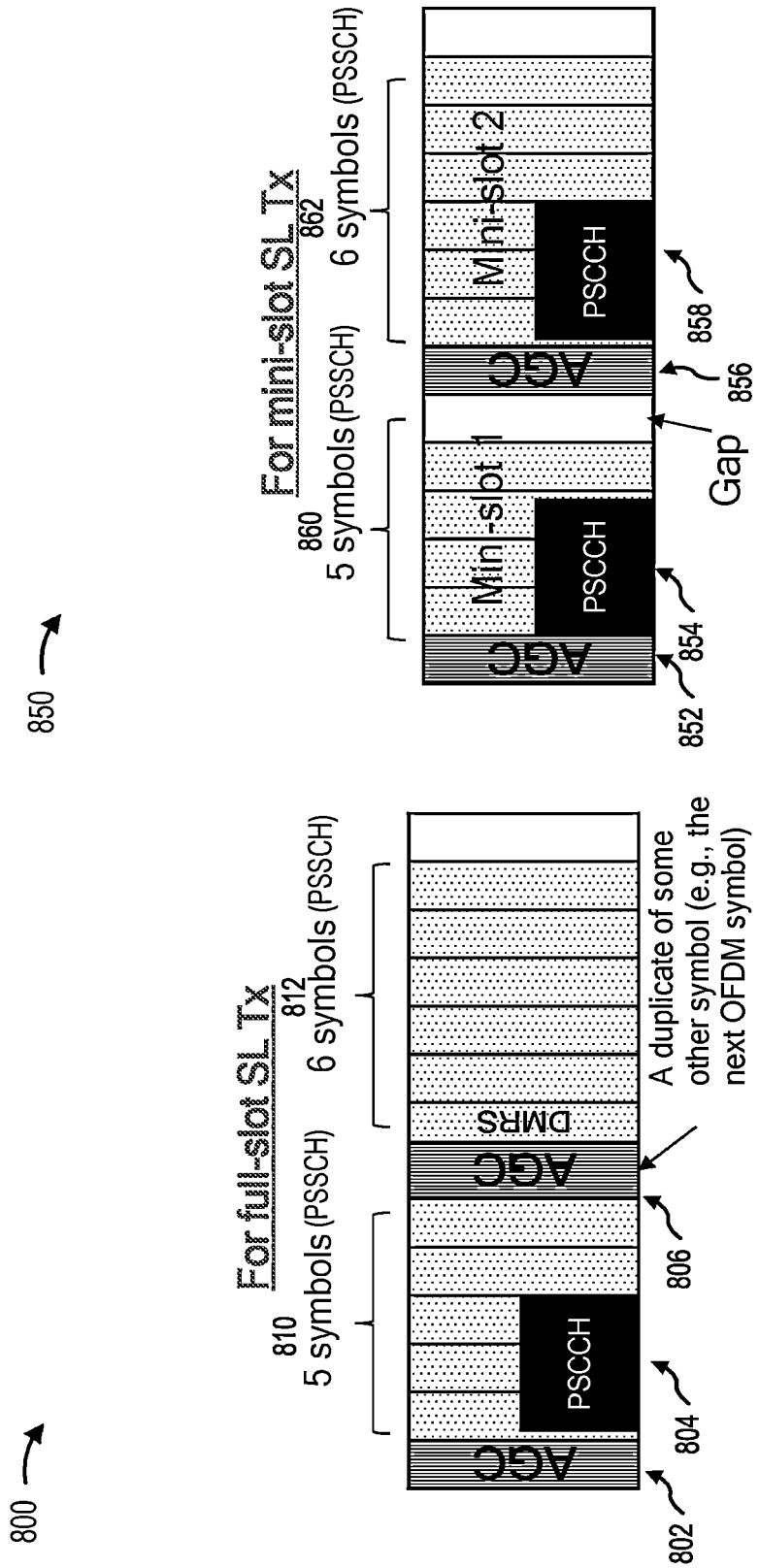
FIG. 8A depicts an example full slot sidelink transmission having multiple AGC symbols.
FIG. 8B depicts an example of sidelink mini-slot structures within a conventional slot structure.

FIG. 8A depicts an example full slot sidelink transmission 800 having multiple AGC symbols.

In the depicted example, sidelink slot structure 800 includes two AGC symbols (802 and 806), which allows receiving user equipment to accurately set amplifier gain. Five PSSCH symbols 810 follow the first AGC symbol 802 before the second AGC symbol 806. As illustrated, the five PSSCH symbols include three PSCCH symbols 804.

As illustrated, the second AGC symbol 806 may be a duplicate of another symbol (e.g., the next OFDM symbol). In the depicted example, the second AGC symbol 806 is followed by 6 PSSCH symbols 812. The first of the 6 PSSCH symbols (e.g., the symbol that follows the second AGC symbol) may include a demodulation reference signal (DMRS), which may be used by the receiver to accurately demodulate (decode) the data signal. For example, the DMRS may be used for channel estimation.

FIG. 8B depicts an example of sidelink mini-slot structures within a slot structure 850. In the depicted example, sidelink slot structure 850 includes 2 mini-slots. Similar to the other sidelink slot structures discussed above with reference to FIG. 5A, each mini-slot (Mini-slot 1 and Mini-slot 2) includes an AGC symbol (852 and 856).

In this sidelink slot structure 850, the first mini-slot (Mini-slot 1) is 7 OFDM symbols in length. The first mini-slot comprises five PSSCH symbols 860 and three PSCCH symbols 854. The PSSCH symbols 860 are followed by a gap symbol. The second mini-slot (Mini-slot 2) is similarly 7 OFDM symbols in length and generally has the same arrangement as the first mini-slot, but may have 6 PSSCH symbols 862, PSCCH symbols 858, and a gap symbol.

Similar to conventional sidelink slot structures, here the entire sidelink slot structure 850 is 14 OFDM symbols in length. However, the first and second mini-slots allow for sending and/or receiving compact data transmissions to multiple recipients and/or senders within a single slot structure. Conventionally, a small data transmission in a full slot structure would have left the remaining slot underutilized, but with mini-slots, slot utilization may be increased, thus leading to greater utilization of the spectrum, while beneficially reducing communication latency.

FIG. 9A depicts an example scenario 900 for sidelink transmissions with an additional AGC symbol, in accordance with certain aspects of the present disclosure. The example scenario 900 depicted in FIG. 9A is similar to example scenario 600 depicted in FIG. 6 in that it illustrates interference caused by sidelink transmission of a mini-slot. Similarly to example scenario 600, UE1 and UE2 are in resource pool 1, whereas UE3 and UE4 are in resource pool 2. As in example scenario 600, UE1 may transmit a slot (e.g., a full slot) to UE2 at 902. In contrast with example scenario 600, however, the full slot transmitted at 902 may include one or more additional AGC symbols, for a total of two or more AGC symbols included in the full slot. As illustrated at 904, UE3 may transmit a mini-slot to UE4. In some cases, UE3's sidelink mini-slot transmission may cause interference (e.g., interference from UE3 to UE2), as illustrated.

FIG. 9B illustrates the slot structures 950 of the full-slot and mini-slot transmissions discussed above with reference to FIG. 9A.

For example, as shown, the full slot transmission by UE1 may include a first AGC symbol 952 and a second AGC symbol 956. These two AGC symbols may allow an Rx UE (e.g., UE2) to adjust AGC twice in a single slot. In some cases, each AGC symbol may correspond to the beginning of a mini-slot (e.g., a mini-slot within a full slot transmission structure). The full slot transmission also includes PSCCH symbols 954 and a demodulation reference signal (DMRS) symbol 958.

The adjustment of AGC corresponding to the second AGC symbol 956 may impact phase continuity of the second half of the full slot, and the DMRS symbol may be used to re-estimate the channel allowing the receiver to accurately demodulate (decode) the data signal.

As illustrated, the mini-slot transmission by UE3 may include an AGC symbol 960 and PSCCH symbols 962. The mini-slot transmission by UE3 may cause interference to reception of the full slot transmission by UE2, as discussed in greater detail above.

As noted above, within a SL slot, a transmit (Tx) UE can make a full-slot SL transmission, or Tx UE can make one or more mini-slot SL transmissions. An Rx UE receiving full-slot SL transmission may readjust its AGC in each AGC symbol. An Rx UE receiving a mini-slot SL transmission may adjust its AGC for the mini-slot using the AGC symbol at the beginning of the mini-slot.

In some cases, each mini-slot contains its own PSCCH. In some cases, there may be a gap symbol between consecutive mini-slot transmissions, and a gap symbol at the end of SL slot. A Tx UE making a full-slot SL transmission may use the in-between gap symbols (except the gap symbol at the end of SL slot) to transmit PSSCH.

Aspects Related to Enabling/Disabling AGC Symbols in Sidelink

As discussed above with reference to FIG. 7, nearby mini-slot transmissions may interfere with reception of full slot transmissions, and this interference is typically not accounted for by AGC. Accordingly, additional AGC symbols may be allocated to full slot SL transmissions. However, if there are no nearby SL Tx UEs performing mini-slot transmissions, transmitting additional AGC symbols by a full-slot Tx UE results in a waste of resources (e.g., a symbol that could have been used to transmit additional data).

Aspects of the present disclosure provide techniques for enabling and disabling transmission of additional AGC symbols in a full slot sidelink transmission, which may help avoid the aforementioned waste of resources. For example, additional AGC symbols may be transmitted by a full-slot Tx SL UE only when one or more conditions are satisfied. One example of such a condition is detection of a nearby UE performing mini-slot transmissions. In other words, additional AGC symbols may be enabled only when mini-slot transmissions by a nearby UE are detected.

Figure 10:
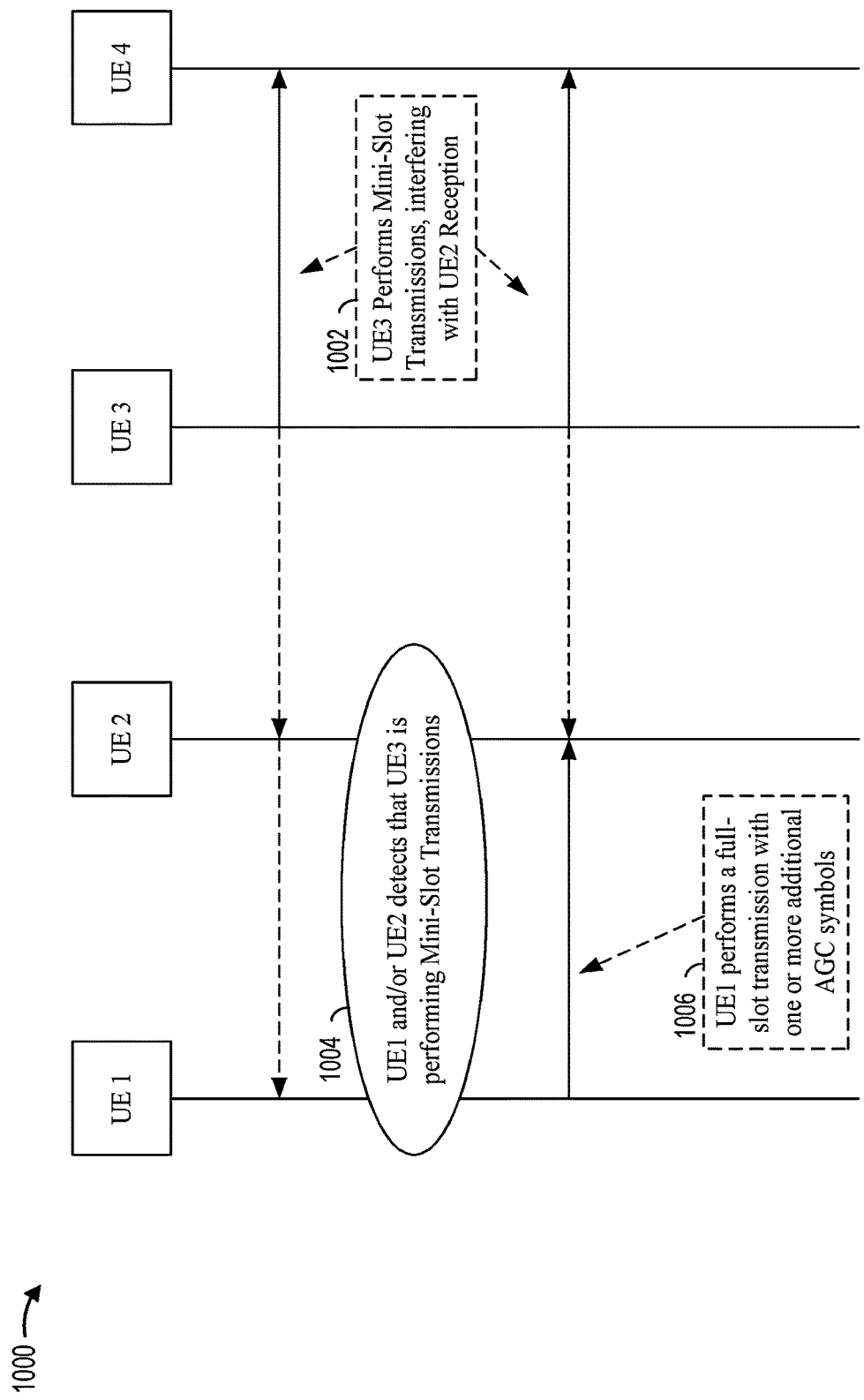
FIG. 10 depicts an example call flow diagram illustrating semi-persistent enabling of mini-slot AGC symbols, in accordance with certain aspects of the present disclosure.

FIG. 10 depicts an example call flow diagram 1000 illustrating semi-persistent enabling of mini-slot AGC symbols, in accordance with certain aspects of the present disclosure. As illustrated at 1002, UE3 may perform mini-slot transmissions interfering with UE2 reception (as indicated by the dashed arrows). This interference may be understood with reference to the graph of receive power illustrated in FIG. 7.

As illustrated at 1004, UE1 and/or UE2 may detect that UE3 is performing the mini-slot transmissions. One example algorithm for how to detect another UE is performing mini-slot transmissions is discussed below with reference to FIG. 11. As illustrated at 1006, UE1 may perform a full-slot transmission including one or more additional AGC symbols (e.g., to account for the interference), based on the detection at 1004.

As mentioned above, the detection that UE3 is performing mini-slot transmissions may satisfy at least one condition, leading UE1 to enable additional AGC symbols in its full-slot transmission including one or more additional AGC symbols.

According to certain aspects, UE1 may directly detect that UE3 is performing the mini-slot transmissions. As an alternative, or in addition, UE2 may detect that UE3 is performing the mini-slot transmissions, and may transmit signaling to UE1 requesting that UE1 transmit the full-slot transmission including one or more additional AGC symbols.

In such cases, receipt of the signaling by UE1 may satisfy the at least one condition, leading to the full-slot transmission including one or more additional AGC symbols. In some cases, the signaling indicates at least one of a quantity of the one or more additional symbols configured for AGC, or a location for the one or more additional symbols configured for AGC.

In some cases, UE 1 may indicate, via sidelink control information (SCI), that the full slot transmission also includes the one or more additional symbols configured for AGC. In such cases, the SCI may also indicate a location of the one or more additional symbols configured for AGC.

In some cases (e.g., in Mode 1 sidelink communications), a network entity (e.g., a gNB) may indicate to a Tx UE to transmit one or more additional AGC symbols and the location of the AGC symbols. Thus, according to certain aspects, UE1 may receive signaling, from a network entity, indicating at least one of a quantity of the one or more additional symbols configured for AGC or a location for the one or more additional symbols configured for AGC.

According to certain aspects, UE1 may disable transmission of the one or more additional symbols configured for AGC (e.g., if a condition that resulted in additional AGC symbols is no longer met). In some cases, UE1 may transmit an indication of the disabling to UE2.

According to certain aspects, UE1 may receive a physical sidelink feedback channel (PSFCH) from the second UE requesting that the first UE enable transmission of the one or more additional symbols configured for AGC or that the first UE disable transmission of the one or more additional symbols configured for AGC.

In some cases, UE1 and/or UE2 may not detect any mini-slot transmissions or the at least one condition may not be satisfied. In such cases, UE1 may transmit a full-slot transmission without any additional AGC symbols (e.g., even if a SL network configuration allows mini-slot transmissions). This may prevent waste of resources (e.g., a symbol that could have been used to transmit additional data), since additional AGC symbols may be unnecessary if there are no nearby SL Tx UEs performing mini-slot transmissions.

In some cases, UE1 may send a configuration message (via either radio resource control (RRC) or medium access control (MAC)-control element (CE)) to UE2 indicating a number of additional AGC symbols and their symbol locations. In some cases, UE1 and UE2 may have configured multiple configurations for transmission of additional AGC symbols, and UE1 may select one of the multiple configurations and transmit additional AGC symbols based on the selected configuration.

Figure 11:
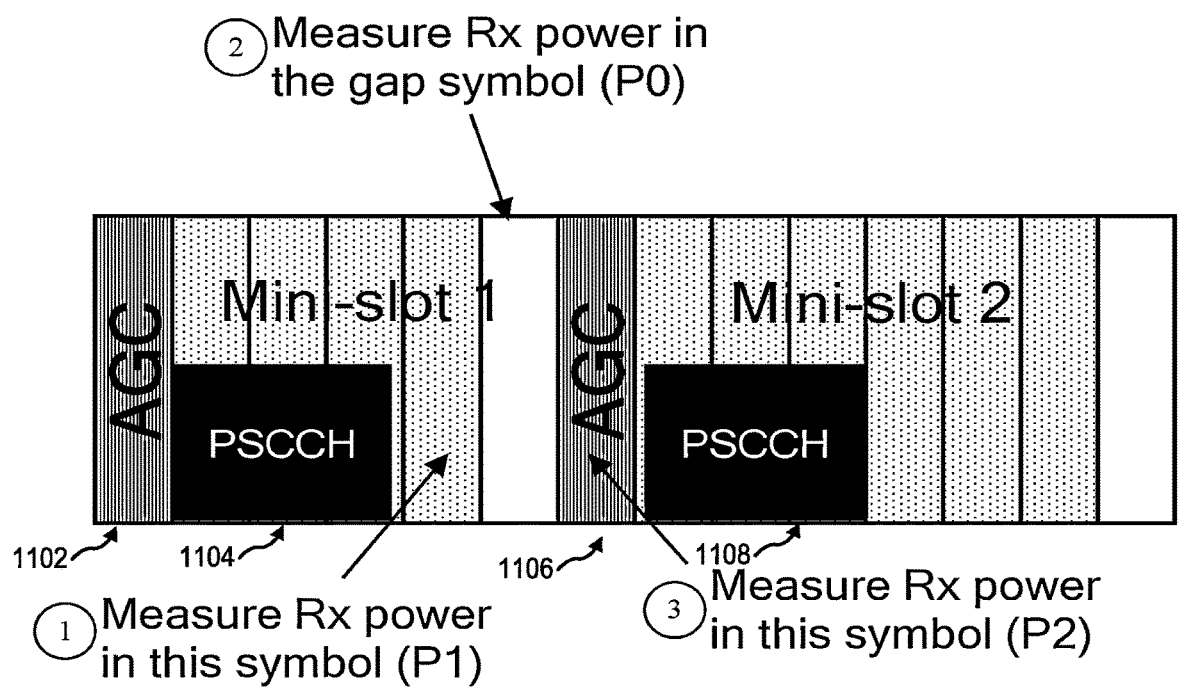
FIG. 11 depicts an example of how a UE may detect mini-slot transmissions from other UEs, in accordance with certain aspects of the present disclosure.

FIG. 11 depicts an example of how a UE may detect mini-slot transmissions from other UEs, in accordance with certain aspects of the present disclosure.

As shown, an Rx UE (e.g., UE2 described above with reference to FIGS. 9A, 9B, and 10) may receive a full slot transmission 1100. The full slot transmission 1100 may include two mini-slots (Mini-slot 1 and Mini-slot 2), and includes two AGC symbols (1102 and 1106 respectively). In some cases, each AGC symbol may correspond to the beginning of a mini-slot (e.g., Mini-slot 1 and Mini-slot 2 within the full slot transmission structure). The full slot transmission also includes PSCCH symbols 1104 and 1108 associated with each of Mini-slot 1 and Mini-slot 2.

An Rx UE may receive a full slot transmission such as the one illustrated in FIG. 11, and may detect mini-slot transmissions from other UEs based on the reception of the full slot transmission. For example, as illustrated the Rx UE may measure Rx power in various symbols of the full slot transmission. As show, in the example illustrated in FIG. 11, the Rx UE measures Rx power P1 in a first symbol at step (1), measures Rx power P0 in a gap symbol at step (2), and measures Rx power P2 at, the AGC symbol 1106 following the gap symbol at step (3).

As noted above with reference to FIG. 7, interference due to a nearby UE's mini-slot transmission may manifest as additional receive power at the Rx UE. In the example illustrated in FIG. 11, the Rx UE measures Rx power at multiple occasions to determine if additional power is received from nearby mini-slot transmissions. If additional power is received, the Rx UE may determine (e.g., detect) that nearby UE's are performing mini-slot transmissions, and may adjust AGC accordingly, using the second AGC symbol 1106 of the full slot transmission.

Example Operations

Figure 12:
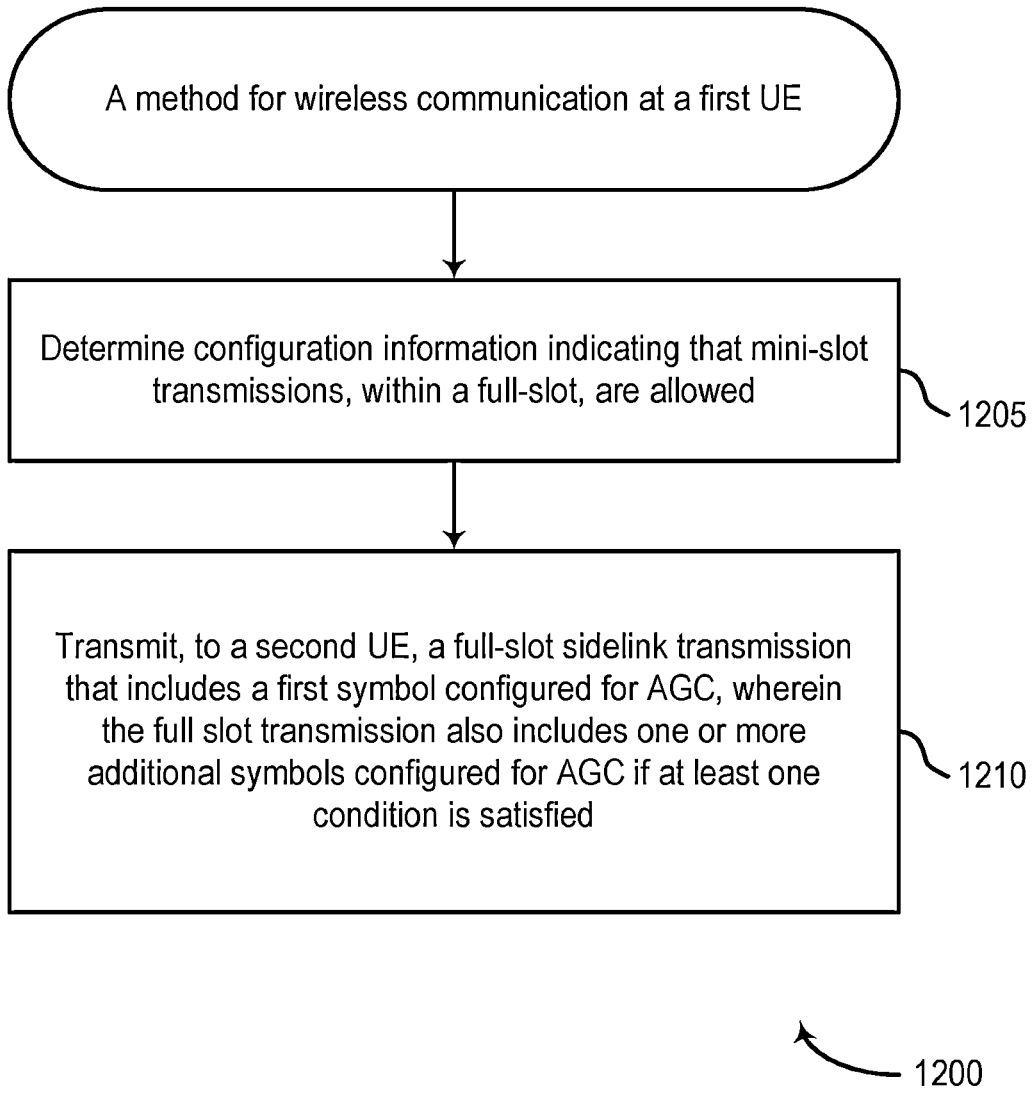
FIG. 12 depicts a method for wireless communications.

FIG. 12 shows an example of a method 1200 of wireless communication at a first UE, such as a UE 104 of FIGS. 1 and 3.

Method 1200 begins at step 1205 with determining configuration information indicating that mini-slot transmissions, within a full-slot, are allowed. In some cases, the operations of this step refer to, or may be performed by, circuitry for determining and/or code for determining as described with reference to FIG. 14.

Method 1200 then proceeds to step 1210 with transmitting, to a second UE, a full-slot sidelink transmission that includes a first symbol configured for AGC, wherein the full slot transmission also includes one or more additional symbols configured for AGC if at least one condition is satisfied. In some cases, the operations of this step refer to, or may be performed by, circuitry for transmitting and/or code for transmitting as described with reference to FIG. 14.

In some aspects, at least one of the first symbol configured for AGC or the additional symbols configured for AGC comprises a duplicate of another symbol.

In some aspects, the at least one condition is satisfied if a third UE is performing mini-slot transmissions.

In some aspects, the method 1200 further includes detecting that the third UE is performing mini-slot transmissions. In some cases, the operations of this step refer to, or may be performed by, circuitry for detecting and/or code for detecting as described with reference to FIG. 14.

In some aspects, the method 1200 further includes receiving signaling from the second UE requesting that the first UE transmit the one or more additional symbols configured for AGC, wherein receipt of the signaling satisfies the at least one condition. In some cases, the operations of this step refer to, or may be performed by, circuitry for receiving and/or code for receiving as described with reference to FIG. 14.

In some aspects, the signaling indicates at least one of: a quantity of the one or more additional symbols configured for AGC; or a location for the one or more additional symbols configured for AGC.

In some aspects, the method 1200 further includes indicating, via SCI, that the full slot transmission also includes the one or more additional symbols configured for AGC. In some cases, the operations of this step refer to, or may be performed by, circuitry for indicating and/or code for indicating as described with reference to FIG. 14.

In some aspects, the SCI indicates a location of the one or more additional symbols configured for AGC.

In some aspects, the method 1200 further includes transmitting, to the second UE, configuration information indicating at least one of: a quantity of the one or more additional symbols configured for AGC or a location of the one or more additional symbols configured for AGC. In some cases, the operations of this step refer to, or may be performed by, circuitry for transmitting and/or code for transmitting as described with reference to FIG. 14.

In some aspects, the configuration information is transmitted via at least one of RRC signaling or a MAC-CE.

In some aspects, the method 1200 further includes receiving signaling, from a network entity, indicating at least one of: a quantity of the one or more additional symbols configured for AGC or a location for the one or more additional symbols configured for AGC. In some cases, the operations of this step refer to, or may be performed by, circuitry for receiving and/or code for receiving as described with reference to FIG. 14.

In some aspects, the method 1200 further includes disabling transmission of the one or more additional symbols configured for AGC. In some cases, the operations of this step refer to, or may be performed by, circuitry for disabling and/or code for disabling as described with reference to FIG. 14.

In some aspects, the method 1200 further includes transmitting, to the second UE, an indication of the disabling. In some cases, the operations of this step refer to, or may be performed by, circuitry for transmitting and/or code for transmitting as described with reference to FIG. 14.

In some aspects, the indication is transmitted via at least one of RRC signaling, a MAC-CE, or SCI.

In some aspects, the method 1200 further includes receiving a PSFCH from the second UE requesting at least one of: that the first UE enable transmission of the one or more additional symbols configured for AGC; or that the first UE disable transmission of the one or more additional symbols configured for AGC. In some cases, the operations of this step refer to, or may be performed by, circuitry for receiving and/or code for receiving as described with reference to FIG. 14.

Figure 14:
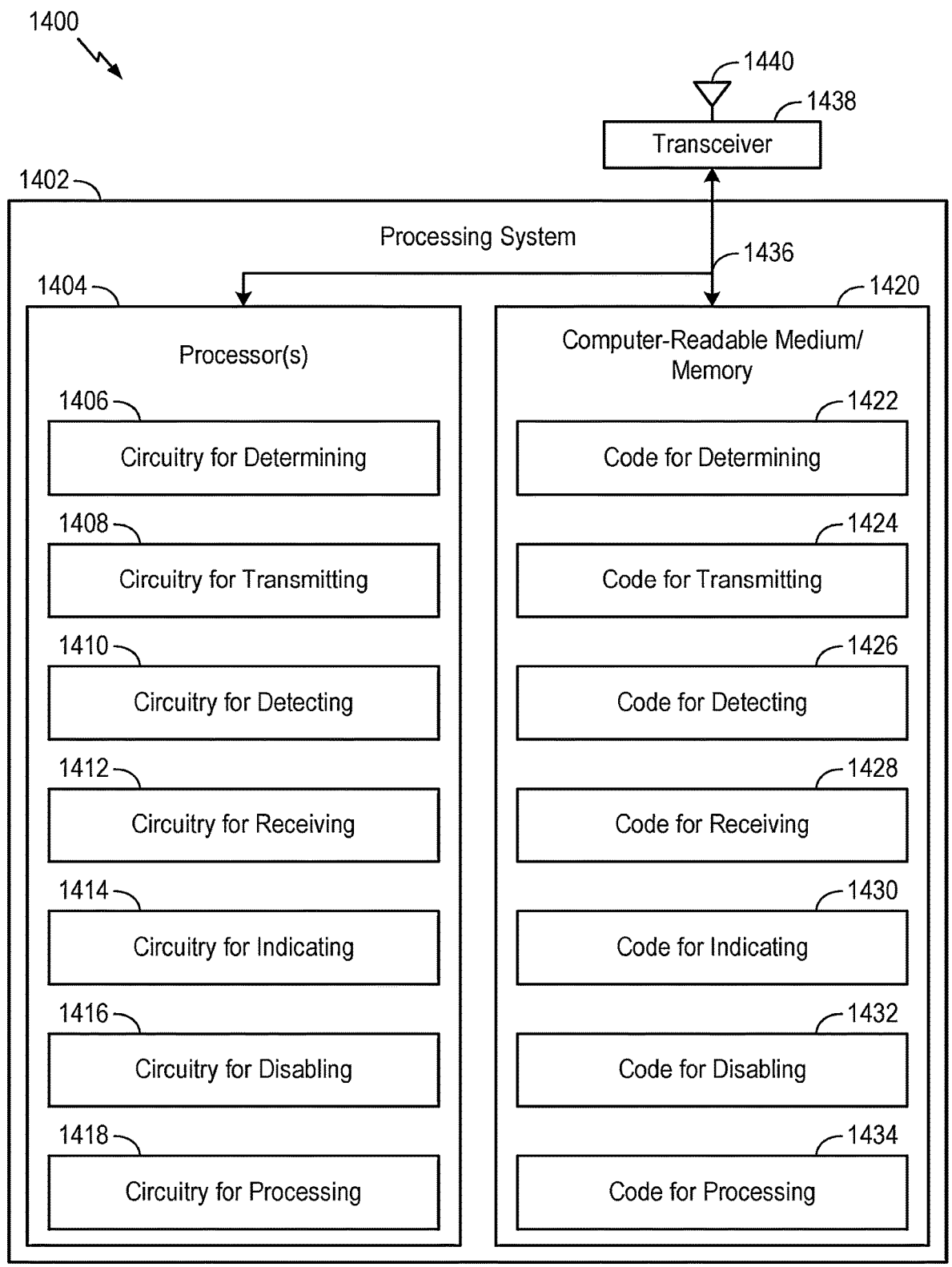
FIG. 14 depicts aspects of an example communications device.

In one aspect, method 1200, or any aspect related to it, may be performed by an apparatus, such as communications device 1400 of FIG. 14, which includes various components operable, configured, or adapted to perform the method 1200. Communications device 1400 is described below in further detail.

Note that FIG. 12 is just one example of a method, and other methods including fewer, additional, or alternative steps are possible consistent with this disclosure.

Figure 13:
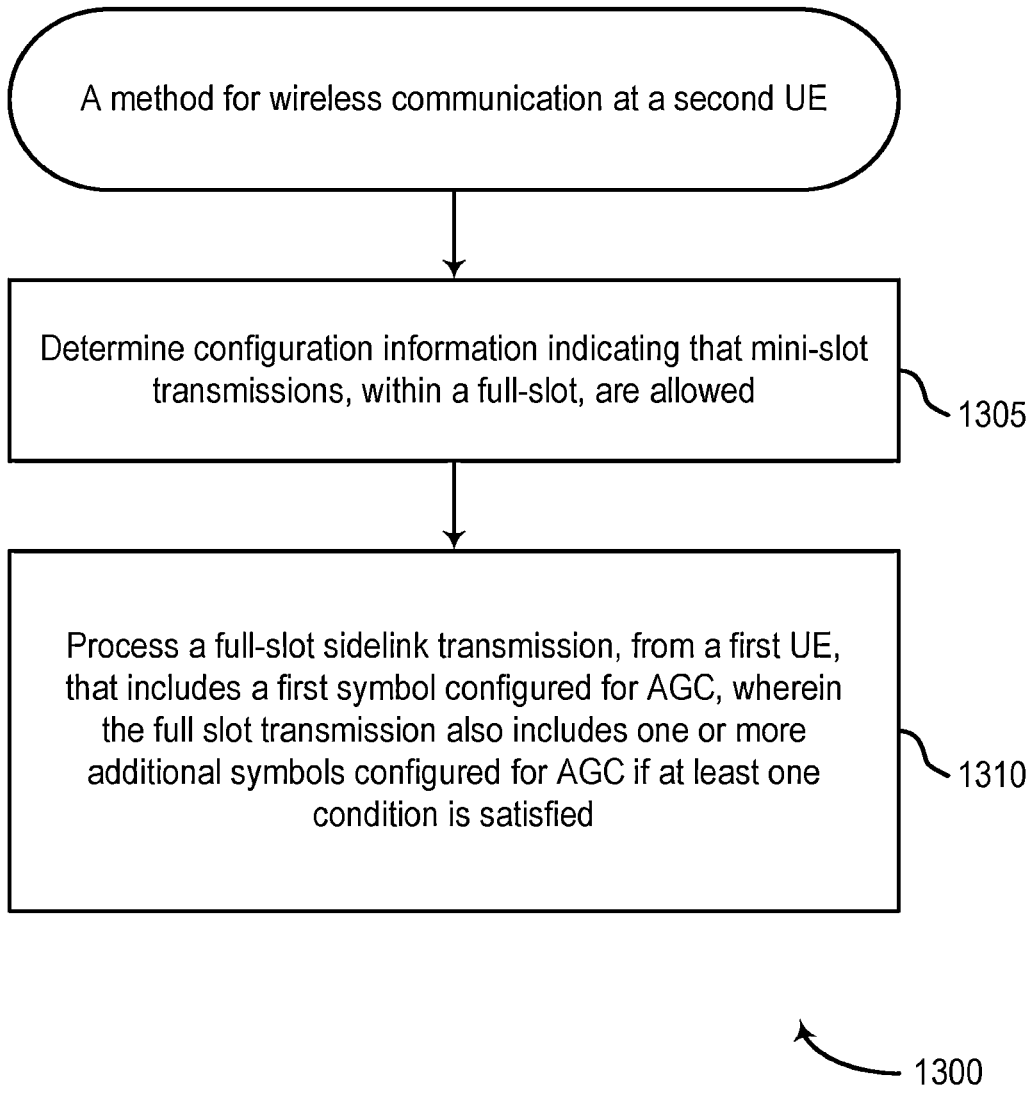
FIG. 13 depicts a method for wireless communications.

FIG. 13 shows an example of a method 1300 of wireless communication at a second UE, such as a UE 104 of FIGS. 1 and 3.

Method 1300 begins at step 1305 with determining configuration information indicating that mini-slot transmissions, within a full-slot, are allowed. In some cases, the operations of this step refer to, or may be performed by, circuitry for determining and/or code for determining as described with reference to FIG. 14.

Method 1300 then proceeds to step 1310 with processing a full-slot sidelink transmission, from a first UE, that includes a first symbol configured for AGC, wherein the full slot transmission also includes one or more additional symbols configured for AGC if at least one condition is satisfied. In some cases, the operations of this step refer to, or may be performed by, circuitry for processing and/or code for processing as described with reference to FIG. 14.

In some aspects, at least one of the first symbol configured for AGC or the additional symbols configured for AGC comprises a duplicate of another symbol.

In some aspects, the processing comprises performing AGC based on at least one of the additional symbols configured for AGC, if the at least one condition is satisfied.

In some aspects, the at least one condition is satisfied if a third UE is performing mini-slot transmissions.

In some aspects, the method 1300 further includes detecting that the third UE is performing mini-slot transmissions. In some cases, the operations of this step refer to, or may be performed by, circuitry for detecting and/or code for detecting as described with reference to FIG. 14.

In some aspects, the method 1300 further includes transmitting signaling to the first UE requesting that the first UE transmit the one or more additional symbols configured for AGC, wherein at least one of transmission of the signaling or receipt of an acknowledgment of the signaling satisfies the at least one condition. In some cases, the operations of this step refer to, or may be performed by, circuitry for transmitting and/or code for transmitting as described with reference to FIG. 14.

In some aspects, the signaling indicates at least one of: a quantity of the one or more additional symbols configured for AGC; or a location for the one or more additional symbols configured for AGC.

In some aspects, the method 1300 further includes receiving an indication, via SCI, that the full slot transmission also includes the one or more additional symbols configured for AGC. In some cases, the operations of this step refer to, or may be performed by, circuitry for receiving and/or code for receiving as described with reference to FIG. 14.

In some aspects, the SCI indicates a location of the one or more additional symbols configured for AGC.

In some aspects, the method 1300 further includes receiving, from the first UE, configuration information indicating at least one of: a quantity of the one or more additional symbols configured for AGC or a location of the one or more additional symbols configured for AGC. In some cases, the operations of this step refer to, or may be performed by, circuitry for receiving and/or code for receiving as described with reference to FIG. 14.

In some aspects, the configuration information is received via at least one of RRC signaling or a MAC-CE.

In some aspects, the method 1300 further includes receiving, from the first UE, an indication that the first UE has disabled transmission of the one or more additional symbols configured for AGC. In some cases, the operations of this step refer to, or may be performed by, circuitry for receiving and/or code for receiving as described with reference to FIG. 14.

In some aspects, the indication is received via at least one of RRC signaling or a MAC-CE.

In some aspects, the method 1300 further includes transmitting, to the first UE, a PSFCH from the second UE requesting at least one of: that the first UE enable transmission of the one or more additional symbols configured for AGC; or that the first UE disable transmission of the one or more additional symbols configured for AGC. In some cases, the operations of this step refer to, or may be performed by, circuitry for transmitting and/or code for transmitting as described with reference to FIG. 14.

In one aspect, method 1300, or any aspect related to it, may be performed by an apparatus, such as communications device 1400 of FIG. 14, which includes various components operable, configured, or adapted to perform the method 1300. Communications device 1400 is described below in further detail.

Note that FIG. 13 is just one example of a method, and other methods including fewer, additional, or alternative steps are possible consistent with this disclosure.

Example Communications Devices

FIG. 14 depicts aspects of an example communications device 1400. In some aspects, communications device 1400 is a user equipment, such as UE 104 described above with respect to FIGS. 1 and 3.

The communications device 1400 includes a processing system 1402 coupled to the transceiver 1438 (e.g., a transmitter and/or a receiver). The transceiver 1438 is configured to transmit and receive signals for the communications device 1400 via the antenna 1440, such as the various signals as described herein. The processing system 1402 may be configured to perform processing functions for the communications device 1400, including processing signals received and/or to be transmitted by the communications device 1400.

The processing system 1402 includes one or more processors 1404. In various aspects, the one or more processors 1404 may be representative of one or more of receive processor 358, transmit processor 364, TX MIMO processor 366, and/or controller/processor 380, as described with respect to FIG. 3. The one or more processors 1404 are coupled to a computer-readable medium/memory 1420 via a bus 1436. In certain aspects, the computer-readable medium/memory 1420 is configured to store instructions (e.g., computer-executable code) that when executed by the one or more processors 1404, cause the one or more processors 1404 to perform the method 1200 described with respect to FIG. 12, or any aspect related to it; and the method 1300 described with respect to FIG. 13, or any aspect related to it. Note that reference to a processor performing a function of communications device 1400 may include one or more processors 1404 performing that function of communications device 1400.

In the depicted example, computer-readable medium/memory 1420 stores code (e.g., executable instructions), such as code for determining 1422, code for transmitting 1424, code for detecting 1426, code for receiving 1428, code for indicating 1430, code for disabling 1432, and code for processing 1434. Processing of the code for determining 1422, code for transmitting 1424, code for detecting 1426, code for receiving 1428, code for indicating 1430, code for disabling 1432, and code for processing 1434 may cause the communications device 1400 to perform the method 1200 described with respect to FIG. 12, or any aspect related to it; and the method 1300 described with respect to FIG. 13, or any aspect related to it.

The one or more processors 1404 include circuitry configured to implement (e.g., execute) the code stored in the computer-readable medium/memory 1420, including circuitry such as circuitry for determining 1406, circuitry for transmitting 1408, circuitry for detecting 1410, circuitry for receiving 1412, circuitry for indicating 1414, circuitry for disabling 1416, and circuitry for processing 1418. Processing with circuitry for determining 1406, circuitry for transmitting 1408, circuitry for detecting 1410, circuitry for receiving 1412, circuitry for indicating 1414, circuitry for disabling 1416, and circuitry for processing 1418 may cause the communications device 1400 to perform the method 1200 described with respect to FIG. 12, or any aspect related to it; and the method 1300 described with respect to FIG. 13, or any aspect related to it.

Various components of the communications device 1400 may provide means for performing the method 1200 described with respect to FIG. 12, or any aspect related to it; and the method 1300 described with respect to FIG. 13, or any aspect related to it. For example, means for transmitting, sending or outputting for transmission may include transceivers 354 and/or antenna(s) 352 of the UE 104 illustrated in FIG. 3 and/or the transceiver 1438 and the antenna 1440 of the communications device 1400 in FIG. 14. Means for receiving or obtaining may include transceivers 354 and/or antenna(s) 352 of the UE 104 illustrated in FIG. 3 and/or the transceiver 1438 and the antenna 1440 of the communications device 1400 in FIG. 14.

Example Clauses

Implementation examples are described in the following numbered clauses:

Clause 1: A method for wireless communication at a first UE, comprising: determining configuration information indicating that mini-slot transmissions, within a full-slot, are allowed; and transmitting, to a second UE, a full-slot sidelink transmission that includes a first symbol configured for AGC, wherein the full slot transmission also includes one or more additional symbols configured for AGC if at least one condition is satisfied.

Clause 2: The method of Clause 1, wherein at least one of the first symbol configured for AGC or the additional symbols configured for AGC comprises a duplicate of another symbol.

Clause 3: The method of any one of Clauses 1 and 2, wherein the at least one condition is satisfied if a third UE is performing mini-slot transmissions.

Clause 4: The method of Clause 3, further comprising: detecting that the third UE is performing mini-slot transmissions.

Clause 5: The method of any one of Clauses 1-4, further comprising: receiving signaling from the second UE requesting that the first UE transmit the one or more additional symbols configured for AGC, wherein receipt of the signaling satisfies the at least one condition.

Clause 6: The method of Clause 5, wherein the signaling indicates at least one of: a quantity of the one or more additional symbols configured for AGC; or a location for the one or more additional symbols configured for AGC.

Clause 7: The method of any one of Clauses 1-6, further comprising: indicating, via SCI, that the full slot transmission also includes the one or more additional symbols configured for AGC.

Clause 8: The method of Clause 7, wherein the SCI indicates a location of the one or more additional symbols configured for AGC.

Clause 9: The method of any one of Clauses 1-8, further comprising: transmitting, to the second UE, configuration information indicating at least one of: a quantity of the one or more additional symbols configured for AGC or a location of the one or more additional symbols configured for AGC.

Clause 10: The method of Clause 9, wherein the configuration information is transmitted via at least one of RRC signaling or a MAC-CE.

Clause 11: The method of any one of Clauses 1-10, further comprising: receiving signaling, from a network entity, indicating at least one of: a quantity of the one or more additional symbols configured for AGC or a location for the one or more additional symbols configured for AGC.

Clause 12: The method of any one of Clauses 1-11, further comprising: disabling transmission of the one or more additional symbols configured for AGC.

Clause 13: The method of Clause 12, further comprising: transmitting, to the second UE, an indication of the disabling.

Clause 14: The method of Clause 13, wherein the indication is transmitted via at least one of RRC signaling, a MAC-CE, or SCI.

Clause 15: The method of any one of Clauses 1-14, further comprising: receiving a PSFCH from the second UE requesting at least one of: that the first UE enable transmission of the one or more additional symbols configured for AGC; or that the first UE disable transmission of the one or more additional symbols configured for AGC.

Clause 16: A method for wireless communication at a second UE, comprising: determining configuration information indicating that mini-slot transmissions, within a full-slot, are allowed; and processing a full-slot sidelink transmission, from a first UE, that includes a first symbol configured for AGC, wherein the full slot transmission also includes one or more additional symbols configured for AGC if at least one condition is satisfied.

Clause 17: The method of Clause 16, wherein at least one of the first symbol configured for AGC or the additional symbols configured for AGC comprises a duplicate of another symbol.

Clause 18: The method of any one of Clauses 16 and 17, wherein the processing comprises performing AGC based on at least one of the additional symbols configured for AGC, if the at least one condition is satisfied.

Clause 19: The method of any one of Clauses 16-18, wherein the at least one condition is satisfied if a third UE is performing mini-slot transmissions.

Clause 20: The method of Clause 19, further comprising: detecting that the third UE is performing mini-slot transmissions.

Clause 21: The method of any one of Clauses 16-20, further comprising: transmitting signaling to the first UE requesting that the first UE transmit the one or more additional symbols configured for AGC, wherein at least one of transmission of the signaling or receipt of an acknowledgment of the signaling satisfies the at least one condition.

Clause 22: The method of Clause 21, wherein the signaling indicates at least one of: a quantity of the one or more additional symbols configured for AGC; or a location for the one or more additional symbols configured for AGC.

Clause 23: The method of any one of Clauses 16-22, further comprising: receiving an indication, via SCI, that the full slot transmission also includes the one or more additional symbols configured for AGC.

Clause 24: The method of Clause 23, wherein the SCI indicates a location of the one or more additional symbols configured for AGC.

Clause 25: The method of any one of Clauses 16-24, further comprising: receiving, from the first UE, configuration information indicating at least one of: a quantity of the one or more additional symbols configured for AGC or a location of the one or more additional symbols configured for AGC.

Clause 26: The method of Clause 25, wherein the configuration information is received via at least one of RRC signaling or a MAC-CE.

Clause 27: The method of any one of Clauses 16-26, further comprising: receiving, from the first UE, an indication that the first UE has disabled transmission of the one or more additional symbols configured for AGC.

Clause 28: The method of Clause 27, wherein the indication is received via at least one of RRC signaling or a MAC-CE.

Clause 29: The method of any one of Clauses 16-28, further comprising: transmitting, to the first UE, a PSFCH from the second UE requesting at least one of: that the first UE enable transmission of the one or more additional symbols configured for AGC; or that the first UE disable transmission of the one or more additional symbols configured for AGC.

Clause 30: An apparatus, comprising: a memory comprising executable instructions; and a processor configured to execute the executable instructions and cause the apparatus to perform a method in accordance with any one of Clauses 1-29.

Clause 31: An apparatus, comprising means for performing a method in accordance with any one of Clauses 1-29.

Clause 32: A non-transitory computer-readable medium comprising executable instructions that, when executed by a processor of an apparatus, cause the apparatus to perform a method in accordance with any one of Clauses 1-29.

Clause 33: A computer program product embodied on a computer-readable storage medium comprising code for performing a method in accordance with any one of Clauses 1-29.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a first user equipment (UE), comprising:
    determining configuration information indicating that mini-slot transmissions, within a full-slot, are allowed; and
    transmitting, to a second UE, a full-slot sidelink transmission that includes a first symbol configured for automatic gain control (AGC), wherein the full slot transmission also includes one or more additional symbols configured for AGC if at least one condition is satisfied.

2. The method of claim 1, wherein at least one of the first symbol configured for AGC or the additional symbols configured for AGC comprises a duplicate of another symbol.

3. The method of claim 1, wherein the at least one condition is satisfied if a third UE is performing mini-slot transmissions.

4. The method of claim 3, further comprising detecting that the third UE is performing mini-slot transmissions.

5. The method of claim 1, further comprising receiving signaling from the second UE requesting that the first UE transmit the one or more additional symbols configured for AGC, wherein receipt of the signaling satisfies the at least one condition.

6. The method of claim 5, wherein the signaling indicates at least one of:
    a quantity of the one or more additional symbols configured for AGC; or
    a location for the one or more additional symbols configured for AGC.

7. The method of claim 1, further comprising indicating, via sidelink control information (SCI), that the full slot transmission also includes the one or more additional symbols configured for AGC.

8. The method of claim 7, wherein the SCI indicates a location of the one or more additional symbols configured for AGC.

9. The method of claim 1, further comprising transmitting, to the second UE, configuration information indicating at least one of: a quantity of the one or more additional symbols configured for AGC or a location of the one or more additional symbols configured for AGC.

10. The method of claim 9, wherein the configuration information is transmitted via at least one of radio resource control (RRC) signaling or a medium access control (MAC) control element (CE).

11. The method of claim 1, further comprising receiving signaling, from a network entity, indicating at least one of:

a quantity of the one or more additional symbols configured for AGC or a location for the one or more additional symbols configured for AGC.

12. The method of claim 1, further comprising disabling transmission of the one or more additional symbols configured for AGC.

13. The method of claim 12, further comprising transmitting, to the second UE, an indication of the disabling.

14. The method of claim 13, wherein the indication is transmitted via at least one of radio resource control (RRC) signaling, a medium access control (MAC) control element (CE), or sidelink control information (SCI).

15. The method of claim 1, further comprising receiving a physical sidelink feedback channel (PSFCH) from the second UE requesting at least one of:
that the first UE enable transmission of the one or more additional symbols configured for AGC; or
that the first UE disable transmission of the one or more additional symbols configured for AGC.

16. A method for wireless communication at a second user equipment (UE), comprising:
determining configuration information indicating that mini-slot transmissions, within a full-slot, are allowed; and
processing a full-slot sidelink transmission, from a first UE, that includes a first symbol configured for automatic gain control (AGC), wherein the full slot transmission also includes one or more additional symbols configured for AGC if at least one condition is satisfied.

17. The method of claim 16, wherein at least one of the first symbol configured for AGC or the additional symbols configured for AGC comprises a duplicate of another symbol.

18. The method of claim 16, wherein the processing comprises performing AGC based on at least one of the additional symbols configured for AGC, if the at least one condition is satisfied.

19. The method of claim 16, wherein the at least one condition is satisfied if a third UE is performing mini-slot transmissions.

20. The method of claim 19, further comprising detecting that the third UE is performing mini-slot transmissions.

21. The method of claim 16, further comprising transmitting signaling to the first UE requesting that the first UE transmit the one or more additional symbols configured for AGC, wherein at least one of transmission of the signaling or receipt of an acknowledgment of the signaling satisfies the at least one condition.

22. The method of claim 21, wherein the signaling indicates at least one of:
a quantity of the one or more additional symbols configured for AGC; or
a location for the one or more additional symbols configured for AGC.

23. The method of claim 16, further comprising receiving an indication, via sidelink control information (SCI), that the full slot transmission also includes the one or more additional symbols configured for AGC.

24. The method of claim 23, wherein the SCI indicates a location of the one or more additional symbols configured for AGC.

25. The method of claim 16, further comprising receiving, from the first UE, configuration information indicating at least one of: a quantity of the one or more additional symbols configured for AGC or a location of the one or more additional symbols configured for AGC.

26. The method of claim 25, wherein the configuration information is received via at least one of radio resource control (RRC) signaling or a medium access control (MAC) control element (CE).

27. The method of claim 16, further comprising receiving, from the first UE, an indication that the first UE has disabled transmission of the one or more additional symbols configured for AGC.

28. The method of claim 27, wherein the indication is received via at least one of radio resource control (RRC) signaling or a medium access control (MAC) control element (CE).

29. An apparatus, comprising: a memory comprising executable instructions; and a processor configured to execute the executable instructions and cause the apparatus to:
determine, by a first user equipment (UE), configuration information indicating that mini-slot transmissions, within a full-slot, are allowed; and
transmit, to a second UE, a full-slot sidelink transmission that includes a first symbol configured for automatic gain control (AGC), wherein the full slot transmission also includes one or more additional symbols configured for AGC if at least one condition is satisfied.

30. An apparatus, comprising: a memory comprising executable instructions; and a processor configured to execute the executable instructions and cause the apparatus to:
determine, at a second user equipment (UE), configuration information indicating that mini-slot transmissions, within a full-slot, are allowed; and
process a full-slot sidelink transmission, from a first UE, that includes a first symbol configured for automatic gain control (AGC), wherein the full slot transmission also includes one or more additional symbols configured for AGC if at least one condition is satisfied.

* * * * *